United States Patent [19]

Bugnet et al.

[11] Patent Number: 5,146,958
[45] Date of Patent: Sep. 15, 1992

[54] METHOD AND APPARATUS FOR PASTING A POROUS PLATE

[75] Inventors: Bernard Bugnet, Saint-Genis-Pouilly; Denis Doniat, Le Perreux; Robert Rouget, Paris, all of France

[73] Assignee: Sorapec S.A., Fontenay-sous-Bois, France

[21] Appl. No.: 613,131

[22] Filed: Nov. 15, 1990

[30] Foreign Application Priority Data

Nov. 16, 1989 [FR] France ............... 89 15291

[51] Int. Cl.$^5$ ............................................. H01M 4/20
[52] U.S. Cl. ..................................... 141/1.1; 141/32; 141/33; 29/623.1
[58] Field of Search ............... 141/1.1, 32, 33; 29/2, 29/623.1, 623.3, 623.5

[56] References Cited

U.S. PATENT DOCUMENTS

| | | | |
|---|---|---|---|
| 3,432,351 | 3/1969 | Davee et al. | 141/1.1 |
| 3,758,340 | 9/1973 | Adams . | |
| 3,894,886 | 7/1975 | Pankow et al. | 141/1.1 |
| 3,951,688 | 4/1976 | Pankow et al. | 141/1.1 |
| 4,197,635 | 4/1980 | Bilhorn . | |
| 4,318,430 | 3/1982 | Perman | 141/32 |
| 4,342,343 | 8/1982 | Clague et al. | 141/1.1 |
| 4,606,783 | 8/1986 | Yanik | 141/32 |

FOREIGN PATENT DOCUMENTS

| | | |
|---|---|---|
| 2299732 | 8/1976 | France . |
| 2548459 | 1/1985 | France . |
| 25913 | 2/1980 | Japan ............... 141/1.1 |
| 195872 | 10/1985 | Japan ............... 141/1.1 |
| 1503623 | 3/1978 | United Kingdom . |
| 2020221 | 11/1979 | United Kingdom . |

OTHER PUBLICATIONS

French Search Report FR 8915291.
A page from Chemical Abstracts, vol. 93, 1980.

Primary Examiner—Ernest G. Cusick
Attorney, Agent, or Firm—Sandler, Greenblum & Berstein

[57] ABSTRACT

Method and apparatus for pasting a porous structure, such as a battery support plate, which provides for inserting pasty material from a vibrating hopper continuously and evenly as a sandwich filling of controlled thickness between two conveyer strips driven at the same speed to deliver pasty material with a predefined thickness and with a flat translational motion onto a substantially horizontal platen; removing the conveyor strip opposite that in contact with the platen to uncover the upper face of the pasty material; bringing the porous structure level with the platen onto the upper surface of the pasty material; pressing the pasty material into the porous structure; and removing the pasted porous structure from the lower strip. The porous structure can be simultaneously pasted on its upper side using a secondary conveyer strip.

21 Claims, 2 Drawing Sheets

METHOD AND APPARATUS FOR PASTING A POROUS PLATE

BACKGROUND OF THE INVENTION

1. Field of the Invention

The present invention relates to a method and apparatus for pasting a porous structure, such as a plate or strip. In this description, pasting means an operation by which material in a pasty state is made to penetrate a highly porous structure. Pasting operations are used, for example, in the production of electrodes made of cadmium, nickel, zinc, hydrides or lead, some of which may be plastified.

2. Discussion of Background and Material Information

French patent specification FR 2 548 459 discloses the composition and fabrication of a plastified cadmium electrode. Such an electrode is produced starting from an electrode support made of nickel foam about 2 mm thick having pores of mean diameter 0.7 mm, and introducing into the electrode support an active material in paste form made by intimately mixing cadmium oxide, a plastifying agent such as, 3% aqueous polytetrafluoroethylene), an alcohol-based diluent (such as, ethanol in an amount of 0.8 ml/g of cadmium), and a thickening agent that improves softness (such as, methyl cellulose in an amount of 1% relative to the mass of cadmium oxide. This pasting operation is followed by a first rolling operation then a first low-temperature drying. To improve its electrochemical cycling lifetime, this electrode is doped by dipping it in a nickel salt bath, then dried a second time. Lastly, a final rolling operation reduces the thickness of the electrode by half, thus consolidating the and providing improved mechanical properties.

SUMMARY OF THE INVENTION

Pasting of the electrode support with a previously-mixed active material in pasty state is an essential but delicate operation in the manufacture of such electrodes. The electrodes' characteristics in terms of their capacity per unit surface area are directly related to the quantity of active material impregnated in the support per unit surface area. An object of the invention is to ensure homogeneity of the quantities of active material impregnated in the support by the application of homogeneous volumes of a paste of known density per unit surface area.

A second advantage sought by the apparatus and method according to the invention is the possibility of preventing rapid evaporation of the diluent from the paste by conveying the paste in such a manner as to prevent contact with air on both its faces until the paste contacts the electrode support.

Another object of the present invention is to provide an industrial method and an apparatus for pasting a porous reticulated structure leading to better performance. The method and apparatus must also be designed to lead to reliable operation for long lifetimes and to permit mass production.

These objects are achieved by means of a method of pasting a porous reticulated structure in the form of a plate or tape, including:

inserting the pasty material continuously and evenly as a sandwich filling between two conveyer strips driven at the same speed to deliver said material with a predefined thickness and with a flat translational motion onto a substantially horizontal platen, removing the conveyer strip opposite that in contact with the platen to uncover the upper face of the pasty material, bringing the porous structure level with the platen onto the upper surface of the material, pressing the pasty material in the porous structure, and removing the pasted porous structure from the lower conveyor strip.

According to another embodiment, the method includes:

inserting pasty material continuously and evenly between two primary conveyer strips driven at the same speed to deliver the pasty material with a flat translational motion onto a substantially horizontal platen, inserting pasty material in parallel continuously and evenly as a sandwich filling between two secondary conveyer strips driven at the same speed as the primary conveyor strips to deliver this second pasty material above the platen, removing the primary conveyer strip opposite that in contact with the platen to uncover the upper face of the first pasty material, removing the secondary conveyer strip opposite that which is furthest removed from the platen to uncover the lower face of the second pasty material level with the platen, bringing the porous structure level with the platen onto the upper surface of the first material, pressing the strips carrying pasty material into contact with the porous structure, removing the upper secondary conveyer strip from the pasted porous structure, and removing the pasted porous structure from the lower primary conveyor strip.

Advantageously, an apparatus for carrying out the method comprises at least two conveyer strips passing downwards past two opposite oblique walls of a vibrating hopper, leaving the bottom of this hopper vertically and parallel to one another and passing between two transverse cylinders for calibrating the thickness and consequently enabling selection and control of the quantity of pasty material taken up per unit surface area of the strip. The quantity of material that will be impregnated per unit surface area of the porous structure in turn enables selection and control of the capacity of the thus-produced electrode per unit surface area.

Preferably, when a conveyor strip must be brought out of contact with the pasty material it is rotated by at least 45° about a cylinder of small diameter.

It can easily be understood that the apparatus according to the invention is particularly advantageous when the pressing operations are carried out by mechanical means comprising a pair of parallel, horizontal cylinders transverse to the direction of motion of the pasty material on the platen, the lower edge of the first cylinder being spaced apart by a predefined distance from the upper edge of the second cylinder which itself is flush with the substantially horizontal platen.

Usefully, the method can be applied for the production of electrodes pasted on one or both sides and especially for electrodes having a porous structure made of nickel and a cadmium-oxide-based pasty material.

BRIEF DESCRIPTION OF THE DRAWINGS

The invention is hereinafter described in greater detail with reference to embodiments given by way of non-limiting example and illustrated in the accompanying drawings, wherein.

DETAILED DESCRIPTION OF THE PREFERRED EMBODIMENTS

To facilitate comprehension, the method and apparatus will be described in connection with the production of cadmium electrodes, it being of course understood that the invention may be used for the production of other flat pieces of composite materials involving a pasting operation.

Firstly, there will be described an apparatus for pasting thin structures involving pasting through one face only.

Figure 1:
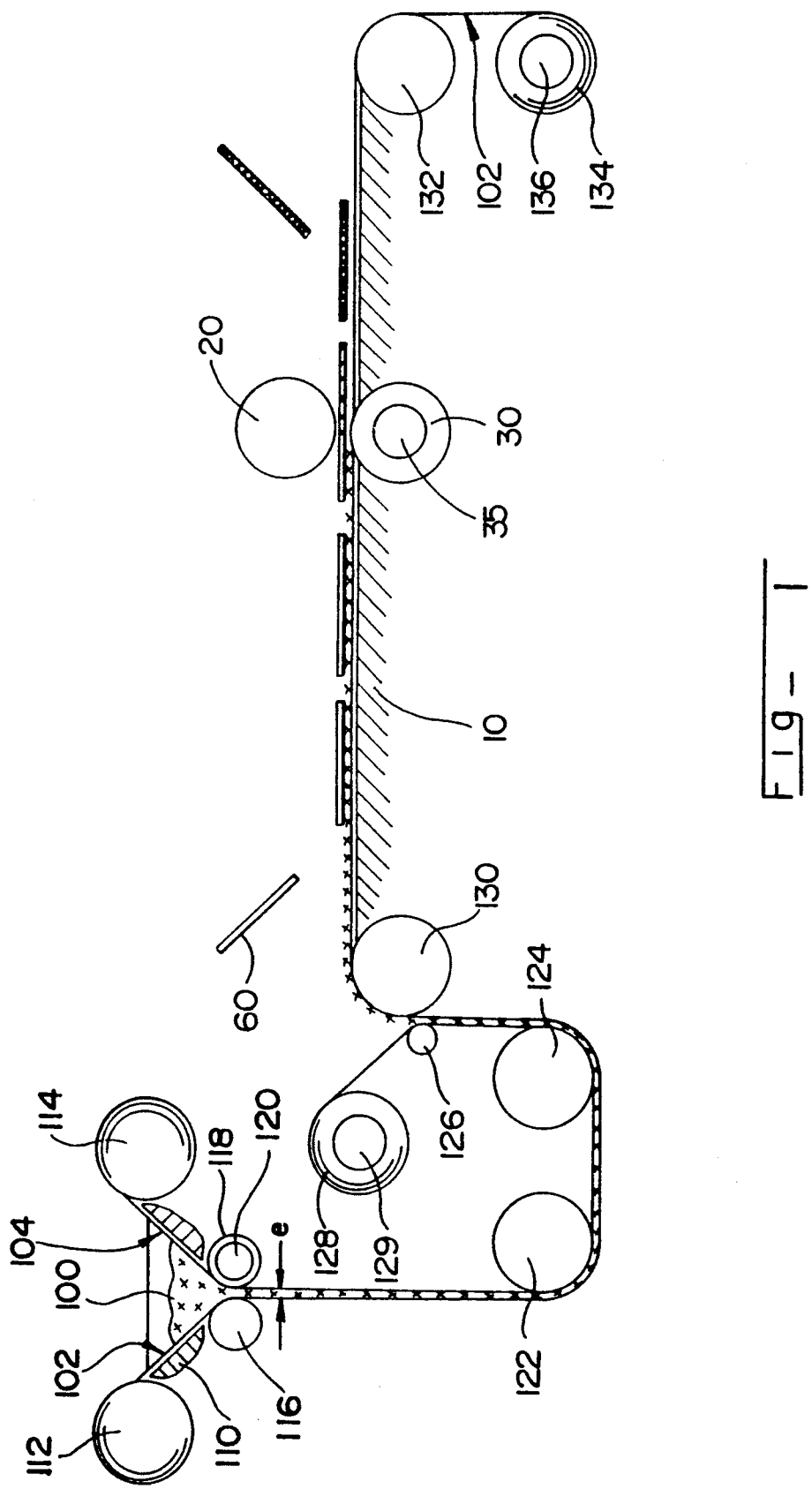
FIG. 1 schematically shows an apparatus for pasting a porous structure on one side only, and FIG. 2 schematically shows an apparatus for simultaneously pasting a plate on both sides.

As shown in FIG. 1, an apparatus designed for pasting through only one face comprises a hopper 110. This hopper is in the form of a trough having two downwardly-directed oblique longitudinal walls closed by vertical lateral (end) walls. The lower edges of the two longitudinal sides are spaced apart to form an opening along the bottom of hopper 110. Two cylinders 116 and 118 are situated adjacent and parallel to respective lower edges of the oblique walls. These two cylinders are driven in rotation by a motor 120 and form a calender roll by means of which the lower opening of hopper 110 can be adjusted.

At least one of the oblique longitudinal walls is vibrated in order to ensure even flow of the paste.

The apparatus also comprises a horizontal platen 10 preferably situated about 80 cm above the ground, i.e. at a standard height for a working surface of a table. The minimum width of platen 10 corresponds to the maximum width of the porous structures 60 to be processed, which are in the form of substantially rectangular plates or strips. Usefully, its width is of the order of 50 cm.

Two cylinders, a lower one 30 and an upper one 20, together form a calender roll situated about half way along platen 10 in the direction of motion of the paste. The axes of these cylinders are arranged one above the other in a plane perpendicular, i.e. orthogonal, to platen 10. The upper edge of lower cylinder 30 is about flush with the surface of platen 10. The height of upper cylinder 20 is adjustable so that the spacing between platen 10 and the lower edge of cylinder 20 can be selected at will. These two cylinders are driven by an independent motor 35.

A first storage drum 112 adjacent and parallel to the upper edge of one of the oblique walls of hopper 110 supplies the apparatus with a first conveyor strip 102, preferably of flexible plastic material. This flexible conveyer strip 102 leaves drum 112 and covers from top to bottom the inner face of the adjacent oblique wall, then leaves vertically, passing between cylinders 116, 118. Strip 102 then passes around pulleys 122, 124 and 130 and is delivered flat onto the upper surface of platen 10. Strip 102 then passes along the entire length of platen 10, including passing between cylinders 20 and 30 of the median calender roll. Finally, after passing around a pulley 132 at the end of platen 10, strip 102 is wound onto a take-up roll 134. This roll 134, driven by a motor 136, pulls the strip 102 all the way along its path from drum 112.

A second supply drum 114 supplies the apparatus with a second conveyer strip 104 of transparent plastic. Drum 114 is adjacent and parallel to the upper edge of the second oblique wall of hopper 110. The second conveyer strip 104 passes, symmetrically relative to the median plane of hoper 110, down the inner face of the second oblique wall and leaves the hopper vertically, i.e. parallel to and facing the first strip 102, by passing between cylinders 116 and 118. The second conveyer strip 104 travels with the first strip 102 around pulleys 122 and 124 up to a small diameter pulley 126 situated just before the pulley 130 at the leading edge (left hand side) of platen 10. Here, strip 104 is removed from strip 102 by passing around pulley 126 and onto a take-up drum 128 driven by a motor 129. Thus, motor 129 drives drum 128 and pulls strip 104 along its entire path from drum 114.

The above-described apparatus operates as follows:

The operator begins by fitting the supply drums 112 and 114 from which he unwinds the conveyer strips 102, 104, passes them along their respective paths, attaches them to their respective take-up drum 134, 128 and switches on their motors 136 and 129. The speeds of these motors are adjusted to make the translational motion of the two strips identical. Then, the motors 120 and 35 of the calender rolls are switched on.

To begin the production of pasted porous electrodes, the operator fills hopper 110 with pasty material 100 of adequate rheological properties. At the outlet of vibrating hopper 110, paste 100 is continuously fed by strips 102/104 with the material 100 evenly distributed per unit surface area of the strips 102/104 by passing between cylinders 116 and 118. The sandwich formed by the pasty material 100 between strips 102/104, which are separated by a distance "e", is then guided by pulleys 122, 124 up to the leading end of platen 10. Just before the leading pulley 130, strip 104 turns by an angle greater than 45° about small-diameter pulley 126, so that it detaches from the pasty material and is wound onto its take-up drum 128. After rotation about pulley 130, strip 102 carries the pasty material 100 with a flat translational motion along platen 10, the upper face of material 10° being no longer protected at this stage.

Between pulley 130 and cylinders 20/30, a porous support 60 is brought into contact with the paste. Then, when support 60 passes between the calender cylinders 20/30, this support 60 is pressed into the paste, i.e., the paste is forced to penetrate in the communicating pores of the support. Because of the rheological properties of the paste, its even distribution on strip 102 and the constant pressure of cylinders 20/30, the pressing operation provides a homogeneous pasting along the entire length of the porous structure.

The length of platen 10 extending beyond cylinders 20/30 forms a disengagement area of the apparatus at the end of which the strip 102 is automatically separated from the lower surface of the pasted plate by rotation about pulley 132.

This apparatus thus enables a paste to be taken up and applied in a perfectly controlled thickness, conveyed while being protected against premature drying, delivered in a convenient way to receive thereon a structure 60 and passed through a calender roll which presses the structure 60 into the paste to produce homogeneous pasting of a given quantity of paste per unit surface area of the structure. Protection of the paste during its initial transport is advantageous in that any short stoppage of the apparatus does not produce alterations in the paste.

Figure 2:
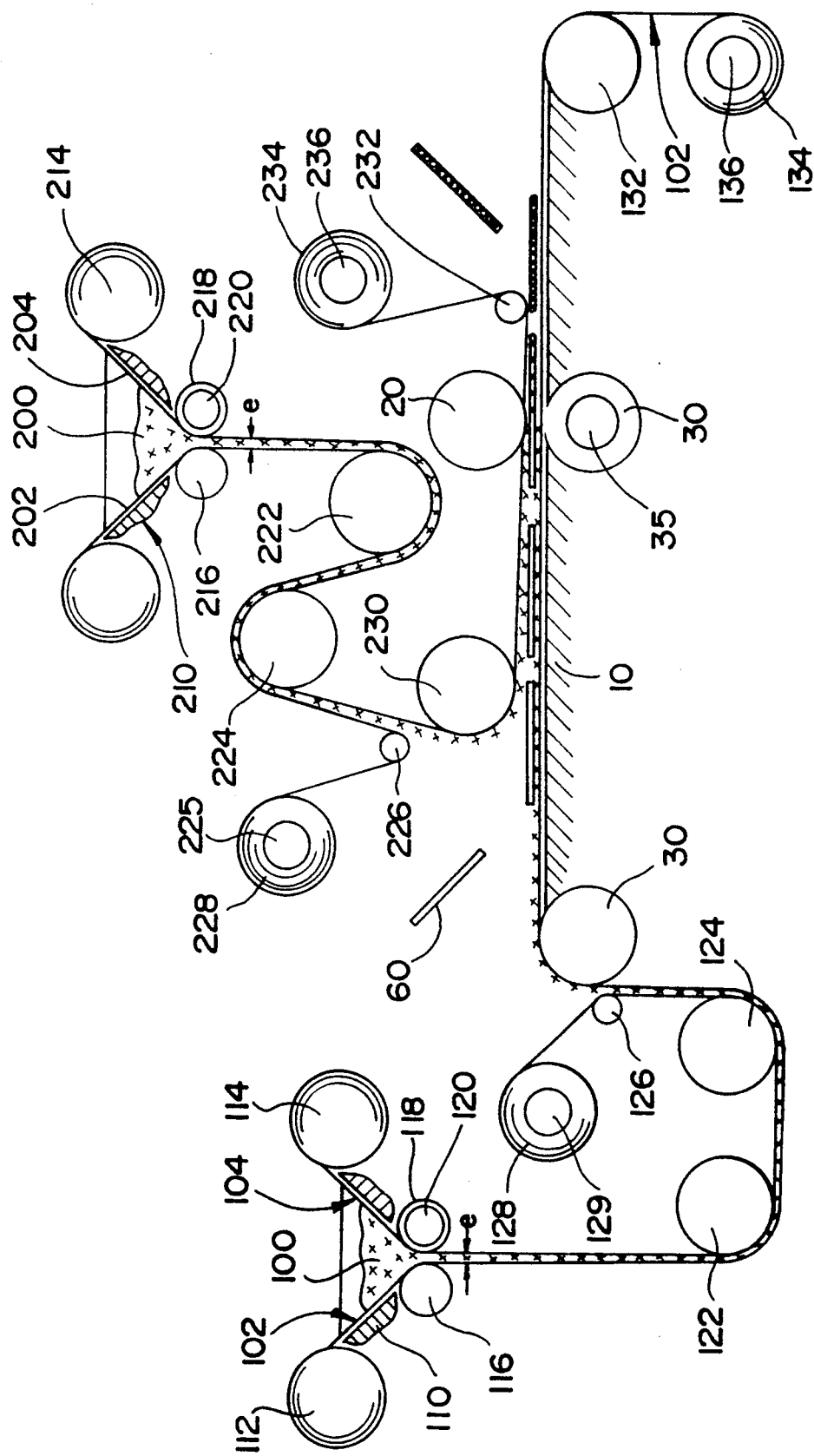

FIG. 2 shows an apparatus designed for pasting a structure 60 simultaneously on its two faces. In this FIG., parts similar to those described previously are designated by the same references. As before, there is a substantially horizontal platen 10 with a median calender roll formed by two cylinders 20 and 30 driven by a motor 35. There is also a first hopper 110 and an arrangement of first conveyor strips 102/104. As before, conveyer strip 104 is pulled away just before reaching platen 10 and is taken up on drum 128, while strip 102 is moved along platen 10 and wound at its other end onto take-up drum 134.

A second device for distributing pasty material 200 comprises a hopper 210 with vibrating means for assisting flow of the paste and having at its outlet a calender roll formed by cylinders 216 and 218 driven by an electric motor 220. A secondary conveyor strip 204 passes firstly over the inner face of one of the oblique walls of hopper 210 then passes between cylinders 216, 218 and leaves following a vertical path. Strip 204 is then guided by pulleys 222, 224 and 230 to come above platen 10. After rotation around pulley 230, the secondary conveyer strip 204 is located above the primary conveyer strip 102 in parallel spaced apart relationship, with its pasty material 200 facing downwards. Strip 204 also passes between cylinders 20 and 30 before passing around a small-diameter pulley 232 from which it is led to a take-up drum 234 rotatably driven by a motor 236.

A second, secondary conveyer strip 202 passes down the oblique wall of hopper 210 facing the wall with strip 204 and then, opposite strip 204, passes through cylinders 216 and 218, about pulleys 222 and 224 and up to a small diameter pulley 226 that guides strip 202 away from strip 204 and onto its take-up drum 228 driven by motor 229.

Operation of the apparatus of FIG. 2 is similar in many ways to that of FIG. 1. After the primary strips 102, 104 have been fitted, the operator passes the secondary strips 202, 204 about pulleys 222, 224 then, firstly, about cylinder 226 and take-up drum 228 for strip 202 and, secondly, about pulley 230 and under small-diameter pulley 232 for strip 204 which is then attached to its take-up drum 234. The speeds of motors 229 and 236 are adjusted in such a manner that the secondary conveyer strips 202, 204 are driven at the same speed, equal to the speed of primary conveyer strips 102, 104. Therefore, secondary conveyer strip 204 moves above plate 10 between pulley 230 and the small-diameter pulley 232 at the same speed as primary conveyer strip 102.

When filling hopper 110 with pasty material 100, the operator also fills hopper 210 with the same material 200. By means of this second device, pasty material is delivered continuously and evenly up to pulley 230, in parallel facing relationship with the first material 100 conveyed by strip 102. Hence, in the subsequent step, the porous structures 60 delivered just in front of pulley 230 are covered over their lower and upper faces with pasty material.

Because of the arrangement of cylinders 20 and 30, pressing of the pasty material takes place equally on both faces Of course, the quantity of conveyed material is controlled by adjusting the cylinders 116/118 and 216/218 to control the distance "e" between strips 102/104 and 202/204 according to the thickness of the porous structures 60 being processed and the sought-after capacity per unit surface of the final electrode.

The invention is of course not limited to the described embodiments but includes variations. For example, without departing from the scope of the invention, any means can be replaced by equivalent means.

I claim:

1. A method of pasting a porous structure, comprising:

inserting pasty material continuously and evenly as a sandwich filling between two primary conveyer strips driven at substantially the same speed to deliver a first pasty material with a predefined thickness and with a flat translational motion onto a substantially horizontal platen, said two primary conveyer strips including a first primary conveyer strip upon which the pasty material is transported on the platen, and a second primary conveyer strip which is removable to expose one surface of the first pasty material;

removing the secondary primary conveyer strip to uncover one surface of the first pasty material;

bringing the porous structure substantially level with the platen, and positioning the porous structure onto said one surface of the first pasty material;

pressing said first pasty material into the porous structure to form a pasted porous structure; and removing the pasted porous structure from the first primary conveyer strip.

2. The method of pasting a porous structure according to claim 1, wherein said removal of the second primary conveyer strip uncovers said first pasty material to expose an upper surface of the first material; and said porous structure is pressed onto said upper surface of the first material.

3. The method of pasting a porous structure according to claim 1, further comprising:

inserting a pasty material continuously and evenly as a sandwich filling between two secondary conveyer strips driven at substantially the same speed as the two primary conveyer strips to deliver a second pasty material with a predefined thickness and with a flat translational motion above the platen, said two secondary conveyer strips including a first secondary conveyer strip upon which the second pasty material is transported adjacent the platen, and a second secondary conveyer strip which is removed to expose one surface of the second pasty material;

removing the second secondary conveyer strip to uncover one surface of the second pasty material; and pressing both said first primary conveyer strip carrying the first pasty material and said first secondary conveyer strip carrying the second pasty material into contact with the porous structure to form the pasted porous structure.

4. The method of pasting a porous structure according to claim 3, wherein removal of the second primary conveyer strip uncovers said first pasty material to expose an upper surface of the first pasty material; removal of the second secondary conveyer strip uncovers said second pasty material to expose a lower surface of the second pasty material; and said porous structure is pressed between said upper surface of the first pasty material and the lower surface of the second pasty material.

5. The method of pasting a porous structure according to claim 3, wherein said porous structure is composed of nickel, and said pasty material is based on cadmium oxide.

6. The method of pasting a porous structure according to claim 1, wherein said porous structure is composed of nickel, and said pasty material is based on cadmium oxide.

7. A method of pasting a porous structure, comprising:

inserting pasty material continuously and evenly as a sandwich filling between at least one set of two conveyer strips driven at substantially the same speed to deliver pasty material with a predefined thickness and with a float translational motion onto a substantially horizontal platen, one set of said at least one set of two conveyer strips including a first conveyer strip upon which the pasty material is transported on the platen, and a second conveyer strip which is removed to expose one surface of the pasty material;

removing the second conveyer strip to uncover one surface of the pasty material having a predefined thickness;

bringing the porous structure substantially level with the platen, and positioning the porous structure onto said one surface of the pasty material;

pressing said pasty material having a predefined thickness into the porous structure to form a pasted porous structure; and removing the pasted porous structure from the first conveyer strip.

8. The method of pasting a porous structure according to claim 7, wherein said second conveyor strip is removed to uncover said one surface of the pasty material by drawing said second conveyor strip at an angle greater than 45° with respect to a plane parallel to said first conveyer strip.

9. An apparatus for pasting of a porous structure, comprising:

at least one vibrating hopper having two opposite oblique walls and a lower outlet;

at least one set of two conveyer strips mounted to pass downwardly along said two opposite oblique walls of said at least one vibrating hopper, and substantially vertically through said lower outlet in spaced, parallel relationship to one another;

means for moving each of said at least one set of two conveyer strips at substantially the same speed;

at least one pair of transverse cylinders for calibrating a quantity of pasty material between two conveyer strips of each set of two conveyer strips of said at least one set of two conveyer strips, with said at least one set of two conveyer strips passing through said at least one pair of transverse cylinders;

means for removing one of said two conveyer strips of each set of said at least one set of two conveyer strips to uncover a surface of pasty material;

a substantially horizontal platen upon which the other of said two conveyer strips of said at least one set of two conveyer strips travels; and means for pressing a porous structure into the uncovered surface of pasty material to form a pasted porous structure.

10. The apparatus according to claim 9, further including means for removing the pasted porous structure from the other of said two conveyer strips of said at least one set of two conveyer strips.

11. The apparatus according to claim 9, wherein said means for removing said one of said two conveyer strips of said at least one set of two conveyer strips comprise a pulley mounted to draw said one of said two conveyer strips at an angle of at least 45° with respect to a plane parallel to the other of said two conveyer strips.

12. The apparatus according to claim 9, wherein said means for pressing comprise a pair of parallel, horizontal cylinders mounted transverse to the direction of travel of said other of said two conveyer strips of said at least one set of two conveyer strips.

13. The apparatus according to claim 12, wherein said horizontal cylinders comprise a first cylinder having a lower edge and a second cylinder having an upper edge, and said first cylinder and said second cylinder are mounted one above the other, with said lower edge of said first cylinder being spaced apart by a predefined distance from said upper edge of said second cylinder.

14. The apparatus according to claim 13, wherein said upper edge of said second cylinder is mounted flush with said substantially horizontal platen.

15. The apparatus according to claim 9, wherein:

said at least one vibrating hopper comprises two vibrating hoppers having two opposite oblique walls and a lower outlet;

said at least one set of two conveyer strips comprises two sets of two conveyer strips, with each set of two conveyer strips being mounted to pass downward along two opposite oblique walls of one of said two vibrating hoppers, and substantially vertically through said lower outlet in spaced, parallel relationship to one another;

at least two pairs of transverse cylinders for calibrating a quantity of pasty material between the two conveyer strips of each set of said two sets of two conveyer strips, with each set of conveyer strips passing between at least one pair of transverse cylinders;

said means for removing one of said two conveyer strips of each set of said two sets of two conveyor strips to uncover a surface of pasty material removes one of said two conveyer strips from each of said two sets of conveyer strips to obtain two uncovered material surfaces; and said means for pressing a porous structure into the uncovered surface of pasty material to form a pasted porous structure is capable of simultaneously pressing the porous structure into the two uncovered material surfaces.

16. The apparatus according to claim 15, wherein said means for pressing comprise a pair of parallel, horizontal cylinders mounted transverse to the direction of travel of said the other of said two conveyer strips of each of said two sets of two conveyer strips.

17. The apparatus according to claim 16, wherein said horizontal cylinders comprise a first cylinder having a lower edge and a second cylinder having an upper edge, and said first cylinder and said second cylinder are mounted one above the other, with said lower edge of said first cylinder being spaced apart by a predefined distance from said upper edge of said second cylinder.

18. The apparatus according to claim 17, wherein said upper edge of said second cylinder is mounted flush with said substantially horizontal platen.

19. The apparatus according to claim 15, wherein said means for removing said one of said two conveyer strips from each of said two sets of two conveyer strips comprise a pulley mounted to draw said one of said two conveyer strips at an angle of at least 45° with respect to a plane parallel to the other of said two conveyer strips.

20. An apparatus for pasting of a porous structure, comprising:
- means for inserting pasty material continuously and evenly as a sandwich filling between two primary conveyer strips driven at substantially the same speed to deliver a first pasty material with a predefined thickness and with a flat translational motion onto a substantially horizontal platen, said two primary conveyer strips including a first primary conveyer strip upon which the pasty material is transported on the platen, and a second primary conveyer strip which is removable to expose one surface of the first pasty material;
- means for removing the second primary conveyer strip to uncover one surface of the first pasty material;
- means for bringing the porous structure substantially level with the platen, and for positioning the porous structure onto said one surface of the first pasty material;
- means for pressing said first pasty material into the porous structure to form a pasted porous structure; and
- means for removing the pasted porous stucture from the first primary conveyer strip.

21. An apparatus for pasting of a porous structure, comprising:
- means for inserting pasty material continuously and evenly as a sandwich filling between at least one set of two conveyer strips driven at substantially the same speed to deliver pasty material with a predefined thickness and with a flat translational motion onto a substantially horizontal platen, one set of said at least one set of two conveyer strips including a first conveyer strip upon which the pasty material is transported on the platen, and a second conveyer strip which is removed to expose one surface of the pasty material;
- means for removing the second conveyer strip to uncover one surface of the pasty material having a predefined thickness;
- means for bringing the porous structure substantially level with the platen, and for positioning the porous structure onto said one surface of the pasty material;
- means for pressing said pasty material having a predefined thickness into the porous structure to form a pasted porous structure; and
- means for removing the pasted porous structure from the first conveyer strip.

* * * * *